United States Patent
Wang et al.

(10) Patent No.: US 12,507,213 B2
(45) Date of Patent: Dec. 23, 2025

(54) METHOD FOR REPLYING WITH RESPONSE FRAME, APPARATUS, AND ACCESS POINT SYSTEM

(71) Applicant: HUAWEI TECHNOLOGIES CO., LTD., Shenzhen (CN)

(72) Inventors: Shengsen Wang, Wuhan (CN); Yizhan Ni, Nanjing (CN); Peng Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 447 days.

(21) Appl. No.: 18/154,223

(22) Filed: Jan. 13, 2023

(65) Prior Publication Data
US 2023/0171744 A1   Jun. 1, 2023

Related U.S. Application Data

(63) Continuation of application No. PCT/CN2021/107886, filed on Jul. 22, 2021.

(30) Foreign Application Priority Data

Jul. 31, 2020   (CN) .......................... 202010757626.2

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0044* (2013.01); *H04L 27/10* (2013.01);
(Continued)

(58) Field of Classification Search
CPC ............ H04W 72/02; H04W 72/0453; H04W 72/0446; H04L 5/00; H04L 5/0044; H04L 5/0094; H04L 1/0061; H04B 7/0452
See application file for complete search history.

(56) References Cited

U.S. PATENT DOCUMENTS

| 2021/0014656 A1* | 1/2021 | Mueck | H04W 4/40 |
| 2021/0345320 A1* | 11/2021 | Lin | H04W 72/0453 |
| 2023/0171744 A1* | 6/2023 | Wang | H04W 72/0446 370/329 |

OTHER PUBLICATIONS

Mcdonald, "Discussion of Critical Timing Issues Associated with the Frequency Hop Phy", IEEE 802.11, Sep. 1994, 11 pages.

* cited by examiner

*Primary Examiner* — Iqbal Zaidi
(74) *Attorney, Agent, or Firm* — Maier & Maier, PLLC

(57) ABSTRACT

A method for replying with a response frame, an apparatus, and an AP system. A radio frequency processing device receives a PPDU sent by an STA. The radio frequency processing device sends, to a baseband processing device by using a wired medium, a frame obtained based on the PPDU. The radio frequency processing device and the baseband processing device are remotely separated. In response to a target signal that is received by using the wired medium and that is from the baseband processing device, the radio frequency processing device generates a target field, and sends the target field to an air interface. The target field at least includes a first field of a response frame of the PPDU. The target signal is used to instruct the radio frequency processing device to immediately respond to the PPDU.

18 Claims, 8 Drawing Sheets

(51) Int. Cl.
*H04L 27/10* (2006.01)
*H04W 72/0446* (2023.01)
*H04W 72/0453* (2023.01)
*H04W 92/10* (2009.01)

(52) U.S. Cl.
CPC ... *H04W 72/0446* (2013.01); *H04W 72/0453* (2013.01); *H04W 92/10* (2013.01)

METHOD FOR REPLYING WITH RESPONSE FRAME, APPARATUS, AND ACCESS POINT SYSTEM

CROSS-REFERENCE TO RELATED APPLICATIONS

This application is a continuation of International Application No. PCT/CN2021/107886, filed on Jul. 22, 2021, which claims priority to Chinese Patent Application No. 202010757626.2, filed on Jul. 31, 2020. The disclosures of the aforementioned applications are hereby incorporated by reference in their entireties.

TECHNICAL FIELD

The embodiments relate to the field of wireless communications technologies, a method for replying with a response frame, an apparatus, and an access point system.

BACKGROUND

In a wireless local area network (WLAN), after receiving a medium access control (MAC) protocol data unit (MPDU), which may also be referred to as a MAC frame, sent by a station (STA), an access point (AP) performs frame filtering based on information in a MAC frame header, and whether to reply with a response frame is determined with reference to a cyclic redundancy code (CRC) check result. If the AP determines that the AP needs to reply with the response frame, the AP needs to send the response frame from an air interface within a short interframe space (SIFS) from an air interface end moment of the MAC frame, that is, total duration from a moment when the AP receives the MAC frame to a moment when the AP sends the response frame needs to be less than one SIFS. The MAC frame is located in a data field of a physical layer protocol data unit (PPDU).

With development of a WLAN technology, to improve WLAN system performance, complexity of an algorithm used for data transmission is increasingly high, and correspondingly, duration consumed by the AP to parse the MAC frame is increasingly long. In addition, when a WLAN system uses a distributed architecture, a baseband unit and a radio frequency unit of the AP are remotely separated and connected by using a wired medium. The distributed architecture also introduces an extra remote transmission delay. Therefore, the AP may not be able to reply with the response frame within one SIFS from the air interface end moment of the MAC frame.

SUMMARY

The embodiments may provide a method for replying with a response frame, an apparatus, and an access point system.

According to a first aspect, a method for replying with a response frame is provided. The method includes: A radio frequency processing device receives a PPDU sent by an STA. Then, the radio frequency processing device sends, to a baseband processing device by using a wired medium, a frame obtained based on the PPDU. The radio frequency processing device and the baseband processing device are remotely separated. In response to a target signal that is received by using the wired medium and that is from the baseband processing device, the radio frequency processing device generates a target field, and sends the target field to an air interface. The target field at least includes a first field of a response frame of the PPDU. The target signal is used to indicate the radio frequency processing device to immediately respond to the PPDU.

The baseband processing device may send, to the radio frequency processing device by using the wired medium, the target signal indicating that the PPDU needs to be responded immediately. After receiving the target signal, the radio frequency processing device immediately generates the target field that includes the first field of the response frame of the PPDU and sends the target field to the air interface. Because a process in which the baseband processing device generates the response frame and transmits the response frame by using the wired medium is relatively complex, the baseband processing device does not need to generate the first field of the response frame, thereby reducing a delay of processing the response frame by the baseband processing device. After receiving the target signal, the radio frequency processing device immediately generates the target field and sends the target field to the air interface. This can improve efficiency of sending the response frame by the radio frequency processing device to the air interface.

Optionally, the radio frequency processing device receives, by using the wired medium, a part that is of the response frame of the PPDU except the target field and that is from the baseband processing device. Then, the radio frequency processing device sends the part of the response frame of the PPDU except the target field to the air interface immediately after sending the target field.

Optionally, the target signal is a single-frequency signal. The radio frequency processing device may perform filtering processing on a signal from the baseband processing device according to a frequency of the target signal, to obtain the target signal.

Optionally, both a signal used to transmit the frame obtained based on the PPDU and a signal used to transmit the part of the response frame of the PPDU except the target field that are between the radio frequency processing device and the baseband processing device are broadband signals. The target signal and the broadband signal are superimposed for transmission. Both the signal used to transmit the frame obtained based on the PPDU and the signal used to transmit the part of the response frame of the PPDU except the target field are transmitted according to a wired communication protocol. Each transmission signal that is between the radio frequency processing device and the baseband processing device and that is based on the wired communication protocol may be a broadband signal.

Optionally, the wired medium includes one or more pairs of signal lines, the broadband signal is a differential signal, and the target signal is a common-mode signal. The radio frequency processing device performs superimposition processing on a signal on a first signal line and a signal on a second signal line, to obtain the target signal. The first signal line and the second signal line are a pair of signal lines used to transmit the target signal.

Optionally, the target field successively includes a legacy short training field and a legacy long training field.

Because L-STFs and L-LTFs of response frames of different PPDUs or response frames of different types may be the same, the radio frequency processing device does not need to know a type of a response frame, and may immediately generate a target field of the response frame based on the indication of the target signal, and send the target field to the air interface, so that the AP system can reply with the response frame within one SIFS from an air interface end moment of the PPDU.

Optionally, the target signal is obtained through OOK modulation.

According to a second aspect, a method for replying with a response frame is provided. The method includes: A baseband processing device receives a frame from a radio frequency processing device by using a wired medium. The frame is obtained based on a physical layer protocol data unit PPDU sent by a station STA, and the radio frequency processing device and the baseband processing device are remotely separated. When the baseband processing device determines, based on the frame, that the STA needs to be replied to with a response frame, the baseband processing device generates a target signal. The target signal is used to indicate the radio frequency processing device to immediately respond to the PPDU. Then, the baseband processing device sends the target signal to the radio frequency processing device by using the wired medium.

The baseband processing device may send, to the radio frequency processing device by using the wired medium, the target signal indicating that the PPDU needs to be responded immediately. After receiving the target signal, the radio frequency processing device immediately generates a target field that includes a first field of a response frame of the PPDU and sends the target field to an air interface. Because a process in which the baseband processing device generates the response frame and transmits the response frame by using the wired medium is relatively complex, the baseband processing device does not need to generate the first field of the response frame, thereby reducing a processing delay of the baseband processing device for the response frame. After receiving the target signal, the radio frequency processing device immediately generates the target field and sends the target field to the air interface. This can improve efficiency of sending the response frame by the radio frequency processing device to the air interface. In addition, the baseband processing device does not need to generate the target field of the response frame, thereby further saving a processing resource of the baseband processing device.

Optionally, the baseband processing device generates a part of the response frame of the PPDU except the target field. The target field at least includes the first domain of the response frame of the PPDU. The baseband processing device sends the part of the response frame of the PPDU except the target field to the radio frequency processing device by using the wired medium.

Optionally, the target signal is a single-frequency signal.

Optionally, both a signal used to transmit the frame obtained based on the PPDU and a signal used to transmit the part of the response frame of the PPDU except the target field that are between the radio frequency processing device and the baseband processing device are broadband signals. An implementation process in which the baseband processing device sends the target signal to the radio frequency processing device by using the wired medium includes:

The baseband processing device couples the target signal to the wired medium, so that the target signal and the broadband signal are superimposed for transmission.

Optionally, the wired medium includes one or more pairs of signal lines, and an implementation process in which the baseband processing device couples the target signal to the wired medium includes:

The baseband processing device couples the target signal to at least one pair of signal lines. The broadband signal is a differential signal, and the target signal on each pair of signal lines is a common-mode signal; or the broadband signal is a common-mode signal, and the target signal on each pair of signal lines is a differential signal.

When the baseband processing device couples the target signal to a plurality of pairs of signal lines for transmission, the radio frequency processing device may combine signals on which filtering processing is performed on the plurality of pairs of signal lines, and determine, based on a combined signal, whether the target signal is received.

Optionally, the target signal is obtained through OOK modulation.

According to a third aspect, a radio frequency processing device is provided. The apparatus includes a plurality of function modules. The plurality of function modules interact with each other to implement the method according to the first aspect and the implementations of the first aspect. The plurality of function modules may be implemented based on software, hardware, or a combination of software and hardware, and the plurality of function modules may be randomly combined or divided based on an implementation.

According to a fourth aspect, a baseband processing device is provided. The apparatus includes a plurality of function modules. The plurality of function modules may interact with each other to implement the method in the second aspect and the implementations of the second aspect. The plurality of function modules may be implemented based on software, hardware, or a combination of software and hardware, and the plurality of function modules may be randomly combined or divided based on an implementation.

According to a fifth aspect, a radio frequency processing device is provided, including a processor and a communications interface. The communications interface includes a wireless communications interface and a wired communications interface The processor is configured to invoke a computer program to implement the method for replying with a response frame according to any one of the implementations of the first aspect.

The processor is configured to exchange information with a station STA through the wireless communications interface, and exchange information with a baseband processing device through the wired communications interface.

According to a sixth aspect, a baseband processing device is provided, including a processor and a communications interface.

The processor is configured to invoke a computer program to implement the method for replying with a response frame according to any one of the implementations of the second aspect.

The processor is configured to exchange information with a radio frequency processing device through the communications interface.

According to a seventh aspect, an AP system is provided, including a baseband processing device and a radio frequency processing device. The baseband processing device and the radio frequency processing device are connected by using a wired medium, and the baseband processing device and the radio frequency processing device are remotely separated.

The baseband processing device is the baseband processing device according to the fourth aspect or the sixth aspect, and the radio frequency processing device is the radio frequency processing device according to the third aspect or the fifth aspect.

According to an eighth aspect, a non-transitory computer storage medium is provided. The non-transitory computer storage medium stores instructions, and when the instructions are executed by a processor of a computer device, the method according to the first aspect and the implementations of the first aspect or the method according to the second aspect and the implementations of the second aspect is implemented.

According to a ninth aspect, a chip is provided. The chip includes a programmable logic circuit and/or program instructions. When the chip runs, the method according to the first aspect and the implementations of the first aspect or the method according to the second aspect and the implementations of the second aspect is implemented.

DETAILED DESCRIPTION OF THE EMBODIMENTS

To make the objectives, solutions, and advantages clearer, the following further describes the embodiments in detail with reference to the accompanying drawings.

Figure 1:
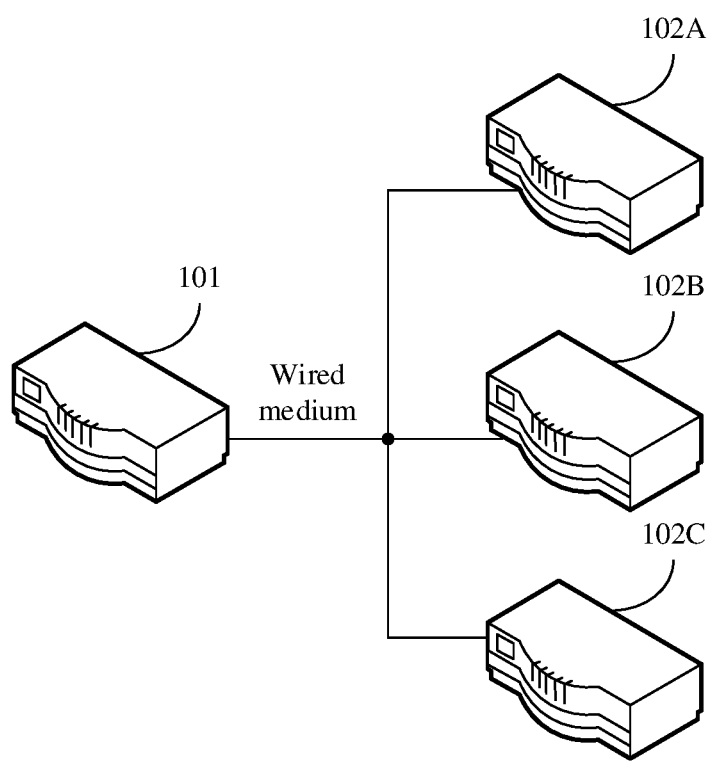
FIG. 1 is a schematic diagram of a structure of an AP system according to an embodiment.

FIG. 1 is a schematic diagram of a structure of an AP system according to an embodiment. As shown in FIG. 1, the AP system includes a baseband processing device 101 and radio frequency processing devices 102A to 102C (collectively referred to as radio frequency processing devices 102). The baseband processing device 101 and the radio frequency processing device 102 are connected by using a wired medium. In this embodiment, the baseband processing device 101 and the radio frequency processing device 102 are remotely separated, that is, the wired medium is not a cable on a circuit board or between circuit boards. Optionally, the wired medium is a network cable, an optical/electrical composite cable, or the like. A quantity of radio frequency processing devices in FIG. 1 is merely used as an example for description and is not intended to limit the AP system provided in this embodiment. The AP system may also include one, two, or more radio frequency processing devices.

The baseband processing device 101 may complete MAC processing and a part of baseband processing. The radio frequency processing device 102 may complete radio frequency processing and another part of baseband processing. Communication between the baseband processing device 101 and the radio frequency processing device 102 is implemented based on a wired communication protocol. The wired communication protocol may be an Ethernet physical protocol. The baseband processing device 101 and the radio frequency processing device 102 jointly implement a function of an AP. Optionally, an intermediate frequency chip/circuit is integrated into the radio frequency processing device 102, or an intermediate frequency chip/circuit is separately deployed.

Figure 2:
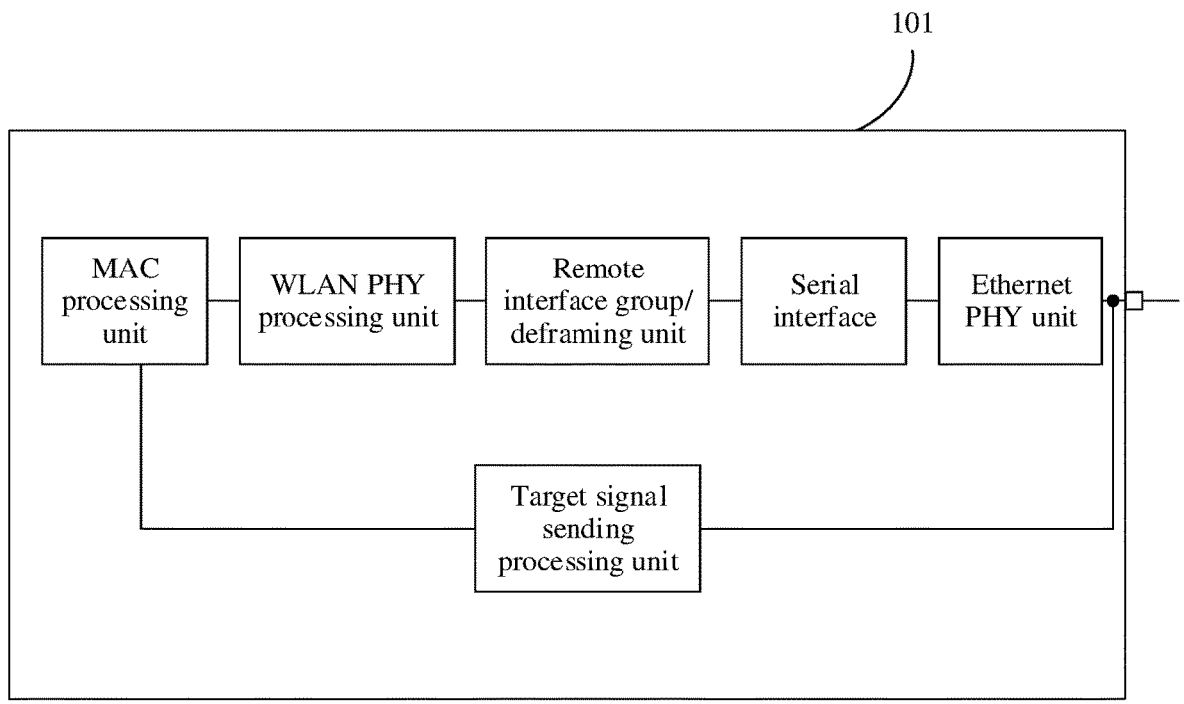
FIG. 2 is a schematic diagram of a structure of a baseband processing device according to an embodiment.

Optionally, FIG. 2 is a schematic diagram of a structure of a baseband processing device according to an embodiment. As shown in FIG. 2, the baseband processing device 101 includes a MAC processing unit, a WLAN physical layer (PHY) processing unit, a remote interface group/deframing unit, a serial interface, an Ethernet PHY unit, and a target signal sending processing unit. The MAC processing unit is configured to complete MAC processing. The WLAN PHY processing unit is configured to complete a part of baseband processing. The remote interface group/deframing unit is configured to form a frame to be sent to a radio frequency processing device and decompose a frame from the radio frequency processing device. The serial interface is used to implement communication between a WLAN and an Ethernet. The Ethernet PHY unit is configured to process a frame that is received and sent by using a wired medium. The target signal sending processing unit and the MAC processing unit are connected, and the target signal sending processing unit is configured to: after the MAC processing unit determines that a PPDU sent by an STA needs to be replied to, generate a target signal, and send the target signal to the radio frequency processing device by using the wired medium. The MAC processing unit and the WLAN PHY processing unit are integrated into a same WLAN chip, or the MAC processing unit and the WLAN PHY processing unit are two separate WLAN chips. The Ethernet PHY unit is an Ethernet chip.

Figure 3:
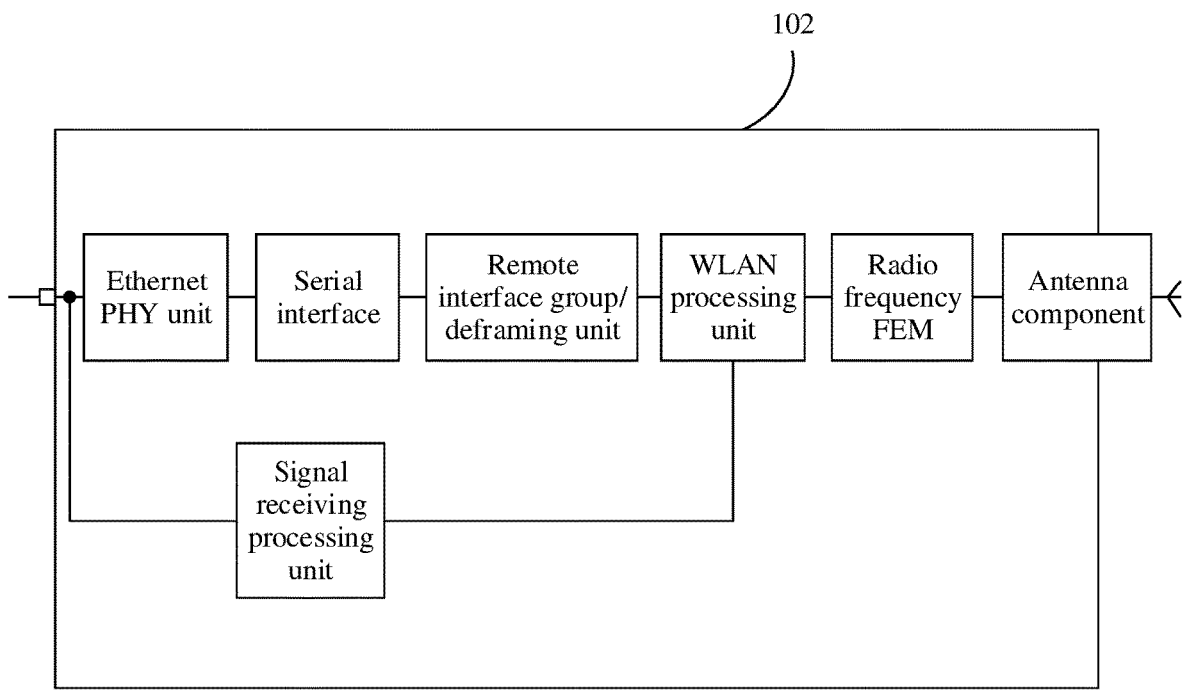
FIG. 3 is a schematic diagram of a structure of a radio frequency processing device according to an embodiment.

Optionally, FIG. 3 is a schematic diagram of a structure of a radio frequency processing device according to an embodiment. As shown in FIG. 3, the radio frequency processing device 102 includes a target signal receiving processing unit, an Ethernet PHY unit, a serial interface, a remote interface group/deframing unit, a WLAN processing unit, a radio frequency front-end module (FEM), and an antenna component. The target signal receiving processing unit and the WLAN processing unit are connected, and the target signal receiving processing unit is configured to: receive and process a signal from a baseband processing device by using a wired medium and transmit an immediate response indication to the WLAN processing unit after determining that a target signal is received. The WLAN processing unit is configured to complete a part of baseband processing and radio frequency processing. For example, after receiving the immediate response indication transmitted by the target signal receiving processing unit, the WLAN processing unit immediately generates a target field that includes a first field of a response frame, and immediately transmits the target field to the antenna component by using the radio frequency FEM. The Ethernet PHY unit is configured to process a frame that is received and sent by using the wired medium. The serial interface is used to implement communication between a WLAN and an Ethernet. The remote interface group/deframing unit is configured to form a frame to be sent to a baseband processing device and decompose a frame from the baseband processing device. The antenna component is configured to receive and send a PPDU from an air interface. The Ethernet PHY unit is an Ethernet chip. The WLAN processing unit is a WLAN chip.

The baseband processing device shown in FIG. 2 and the radio frequency processing device shown in FIG. 3 are connected through a network cable. If optical modules are used to replace the Ethernet PHY units in FIG. 2 and FIG. 3, the baseband processing device and the radio frequency processing device are connected through an optical/electrical composite cable.

Figure 4:
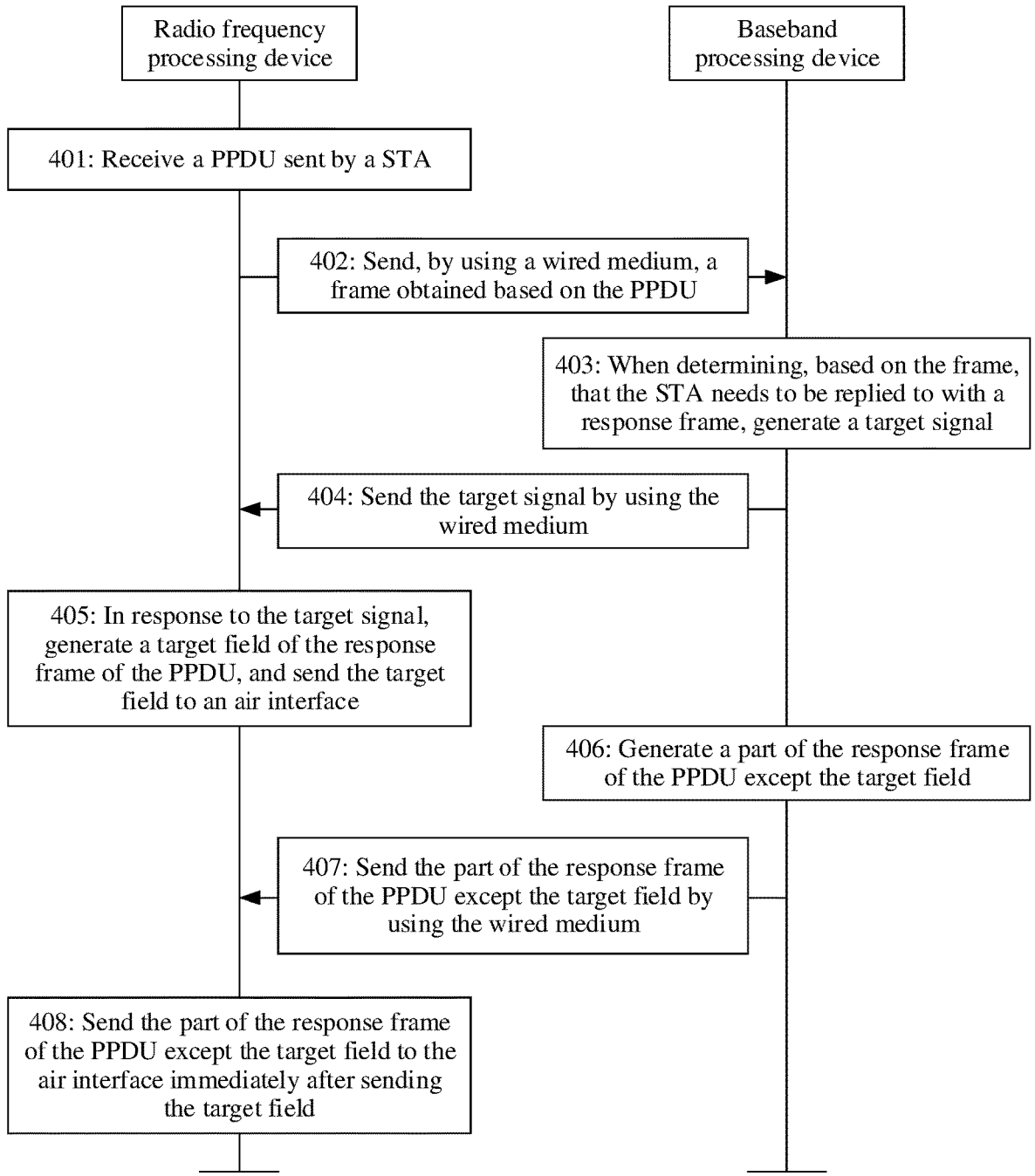
FIG. 4 is a schematic flowchart of a method for replying with a response frame according to an embodiment.

FIG. 4 is a schematic flowchart of a method for replying with a response frame according to an embodiment. The method may be applied to the AP system shown in FIG. 1. As shown in FIG. 4, the method includes:

Step 401: A radio frequency processing device receives a PPDU sent by an STA.

The STA is any STA in a WLAN in which the AP system is located. Content carried in a data field of the PPDU is a physical layer valid payload and may be referred to as a physical layer service data unit (PSDU). A MAC frame is located in the data field of the PPDU. The MAC frame includes data, control signaling, management signaling, or the like.

Step 402: The radio frequency processing device sends, to a baseband processing device by using a wired medium, a frame obtained based on the PPDU.

Optionally, a structure of the radio frequency processing device is shown in FIG. 3. After receiving, from the air interface by using the radio frequency FEM and the antenna component, the PPDU sent by the STA, the radio frequency processing device performs processing on the PPDU by using the WLAN processing unit, performs framing by using the remote interface group/deframing unit, to obtain the frame obtained based on the PPDU, then transmits the frame to the Ethernet PHY unit through the serial interface, and transmits, to the baseband processing device by using the wired medium, the frame obtained after being processed by the Ethernet PHY unit.

Step 403: When the baseband processing device determines, based on the frame, that the STA needs to be replied to with a response frame, the baseband processing device generates a target signal.

The target signal is used to indicate the radio frequency processing device to immediately respond to the PPDU. The baseband processing device determines, based on the frame, that the STA needs to be replied to with the response frame, that is, the baseband processing device determines, based on the PPDU, that the STA needs to be replied to with the response frame of the PPDU.

Optionally, a structure of the baseband processing device is shown in FIG. 2. The baseband processing device receives the frame from the radio frequency processing device by using the wired medium, transmits, to the remote interface group/deframing unit through the serial interface, the frame obtained after being processed by the Ethernet PHY unit, and then performs deframing by using the remote interface group/deframing unit and transmits the frame to the WLAN PHY processing unit. The WLAN PHY processing unit completes receiving processing at a WLAN PHY layer, and then reports a decoding result to the MAC processing unit.

The MAC processing unit performs frame filtering based on information in a MAC frame header, and determines, based on a CRC result, whether to reply with the response frame. After determining that the MAC processing unit needs to reply with the response frame, the MAC processing unit transmits an immediate response indication to the target signal sending processing unit. The target signal sending processing unit generates the target signal based on the received immediate response indication.

Optionally, the target signal is a single-frequency signal. The single-frequency signal may be a signal with only one frequency. A frequency of the target signal is not limited in this embodiment, provided that the target signal can be distinguished from another signal.

Optionally, the target signal is obtained through on-off keying (OOK) modulation.

Step 404: The baseband processing device sends the target signal to the radio frequency processing device by using the wired medium.

Optionally, a transmission signal that is between the baseband processing device and the radio frequency processing device and that is based on a wired communication protocol is a broadband signal. For example, both a signal used to transmit the frame obtained based on the PPDU in the foregoing step 402 and a signal used to transmit a part of the response frame of the PPDU except a target field in the following step 407 are broadband signals. The broadband signal is a signal whose bandwidth is close to or greater than a center frequency (that is, a non-narrowband signal). An implementation process of step 404 includes: The baseband processing device couples the target signal to the wired medium, so that the target signal and the broadband signal are superimposed for transmission. A wired communications interface connected to the wired medium on the baseband processing device is connected to a coupler or integrated with a coupler. The coupler couples, to the wired medium for transmission, the target signal output by the target signal sending processing unit. The wired communications interface may be, for example, an RJ45 interface.

Optionally, the wired medium includes one or more pairs of signal lines. For example, a network cable generally includes four pairs of twisted pairs, and each twisted pair is used as a pair of signal lines. The transmission signal between the baseband processing device and the radio frequency processing device based on the wired communication protocol is transmitted as a differential signal or a common-mode signal on a pair of signal lines. The baseband processing device couples the target signal to at least one pair of signal lines.

In this embodiment, the baseband processing device may separately couple the target signal to a plurality of pairs of signal lines, so that the target signal is transmitted on each pair of signal lines, thereby improving reliability of receiving the target signal by the radio frequency processing device.

Figure 5:
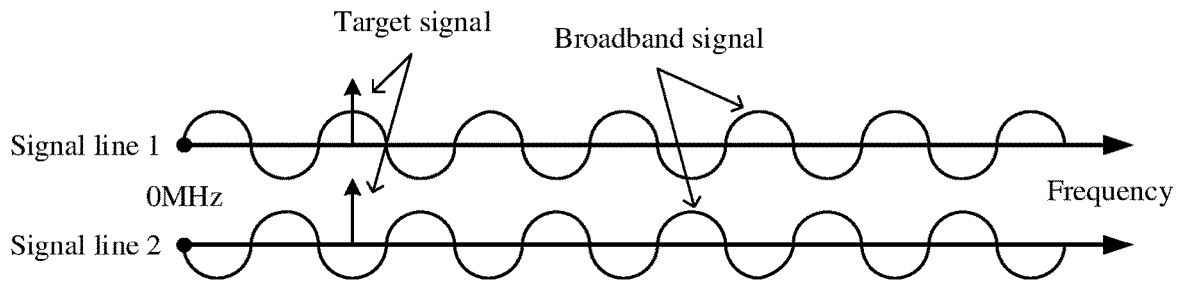
FIG. 5 is a schematic diagram of a transmission relationship between a target signal and a bandwidth signal on a pair of signal lines according to an embodiment.

Optionally, the broadband signal is a differential signal, and the target signal on each pair of signal lines is a common-mode signal; or the broadband signal is a common-mode signal, and the target signal on each pair of signal lines is a differential signal. For example, FIG. 5 is a schematic diagram of a transmission relationship between the target signal and the bandwidth signal on a pair of signal lines according to this embodiment. As shown in FIG. 5, the pair of signal lines includes a signal line 1 and a signal line 2, the broadband signal is transmitted as a differential signal, and the target signal is transmitted as a common mode signal. The horizontal axis represents a frequency. The target signal is a single-frequency signal.

Step 405: In response to the target signal, the radio frequency device generates the target field of the response frame of the PPDU and sends the target field to the air interface.

The target field at least includes a first field of the response frame of the PPDU. As defined in the Institute of Electrical and Electronics Engineers (IEEE) 802.11 series protocol, the first field of the response frame of the PPDU is a legacy short training field (L-STF).

Optionally, the target field successively includes the L-STF and a legacy long training field (L-LTF). This embodiment may provide the following two implementations in which the radio frequency processing device generates the target field and sends the target field to the air interface.

In a first implementation, the radio frequency processing device stores time-field discrete signals of the L-STF and the L-LTF. After receiving the immediate response indication from the target signal receiving processing unit, the WLAN processing unit of the radio frequency processing device immediately reads the corresponding time-field discrete signals of the L-STF and the L-LTF based on bandwidth, then successively performs time-field processing, digital-to-analog conversion processing, intermediate frequency processing, and radio frequency processing on the read time-field discrete signals, and finally sends the processed signal to the air interface by using the antenna component.

In a second implementation, the radio frequency processing device stores an L-STF sequence and an L-LTF sequence (specified in a standard). After receiving the immediate response indication from the target signal receiving processing unit, the WLAN processing unit of the radio frequency processing device immediately reads the L-STF sequence and the L-LTF sequence, then successively performs frequency-field processing, inverse discrete Fourier transform processing, time-field processing, digital-to-analog conversion processing, intermediate frequency processing, and radio frequency processing on the read L-STF sequence and the read L-LTF sequence, and finally sends the processed signal to the air interface by using the antenna component.

The foregoing two implementations are described by using an example in which an intermediate frequency circuit is integrated into the WLAN processing unit of the radio frequency processing device. If the intermediate frequency circuit is separately deployed, in the foregoing implementation, the WLAN processing unit does not perform an intermediate frequency processing process, and the intermediate frequency processing process is performed by the intermediate frequency circuit that is separately deployed.

Figure 6:
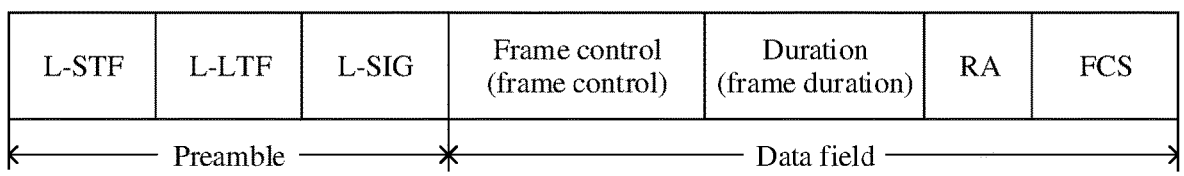
FIG. 6 is a schematic diagram of a structure of a response frame of a PPDU according to an embodiment.

Optionally, the response frame of the PPDU may be an acknowledgment (ACK) frame, a clear to send (CTS) frame, or another response frame defined in the IEEE 802.11 series protocol or draft. This is not limited in this embodiment. For example, FIG. 6 is a schematic diagram of a structure of the response frame of the PPDU according to this embodiment. As shown in FIG. 6, the response frame includes an L-STF, an L-LTF, a legacy signal (L-SIG) field, and a data field. The L-STF, the L-LTF, and the L-SIG field are preambles. The data field includes a frame control field, a frame duration (duration) field, a receiver address (RA) field, and a frame check sequence (FCS) field.

In this embodiment, because L-STFs and L-LTFs of response frames of different PPDUs or response frames of different types may be the same, the radio frequency processing device may not need to know a type of a response frame and may immediately generate a target field of the response frame based on the indication of the target signal, and send the target field to the air interface, thereby improving replying efficiency of the response frame, so that the AP system can reply with the response frame within one SIFS from an air interface end moment of the PPDU.

Optionally, when the broadband signal is a differential signal, the target signal on the one or more pairs of signal lines in the wired medium is a common-mode signal. The radio frequency processing device performs superimposition processing on a signal on a first signal line and a signal on a second signal line, to obtain a superimposed signal. The first signal line and the second signal line are a pair of signal lines used to transmit the target signal. That is, after receiving a signal from the baseband processing device by using the wired medium, the radio frequency processing device performs superimposition processing on the signals on each pair of signal lines, to obtain the target signal.

Alternatively, when the broadband signal is a common-mode signal, the target signal on the one or more pairs of signal lines in the wired medium is a differential signal. After receiving a signal from the baseband processing device by using the wired medium, the radio frequency processing device first performs subtraction processing on the signals on each pair of signal lines, to obtain the target signal.

In this embodiment, when the target signal is transmitted on the plurality of pairs of signal lines, the radio frequency processing device may combine signals on which superposition processing or subtraction processing is performed on the plurality of pairs of signal lines, and determine, based on a combined signal, whether the target signal is received.

Figure 7:
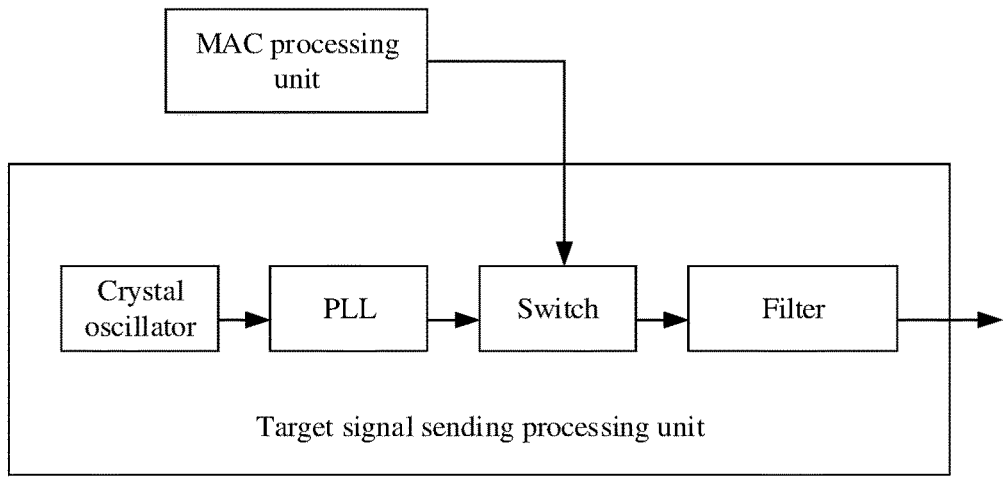
FIG. 7 is a schematic diagram of a structure of a target signal sending processing unit according to an embodiment.
Figure 8:
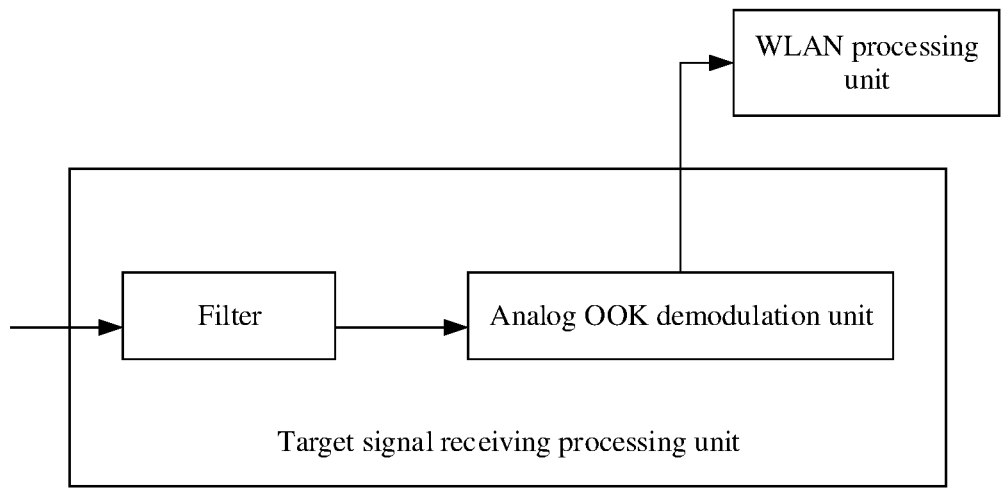
FIG. 8 is a schematic diagram of a structure of a target signal receiving processing unit according to an embodiment.

Optionally, the target signal is obtained through OOK modulation, and may be obtained through analog OOK modulation or digital OOK modulation. Implementation processes of the two modulation schemes are as follows:

In an optional embodiment, the target signal is obtained through analog OOK modulation. Optionally, FIG. 7 is a schematic diagram of a structure of a target signal sending processing unit according to this embodiment. FIG. 8 is a schematic diagram of a structure of a target signal receiving processing unit according to this embodiment.

As shown in FIG. 7, the target signal sending processing unit includes a crystal oscillator (for example, an oven controlled oscillator (OCXO)), a phase-locked loop (PLL), a switch, and a filter. The crystal oscillator and the phase-locked loop are configured to generate an analog signal with a specified frequency. The analog signal is the single-frequency signal (that is, the target signal), and a frequency of the analog signal may be determined based on a type and/or a length of the wired medium. The switch and the MAC processing unit are connected. After determining that the PPDU sent by the STA needs to be replied to, the MAC processing unit controls the switch to be turned on, that is, the analog signal is output. Otherwise, the switch is turned off, that is, no signal is output. The filter is configured to perform filtering processing on the output signal, to filter out an interference signal in the output signal. The filter may be a low-pass filter.

As shown in FIG. 8, the target signal receiving processing unit includes a filter, an analog OOK demodulation unit, and the like. The filter is configured to filter out the target signal. The filter may be a low-pass filter or the filter may be a wavetrap. The analog OOK demodulation unit and the WLAN processing unit are connected. The analog OOK demodulation unit is configured to: perform OOK demodulation on the filtered signal, and after determining that the target signal is obtained, transmit the immediate response indication to the WLAN processing unit. The analog OOK demodulation unit may include a comparator, a wave-detector, and the like.

Figure 9:
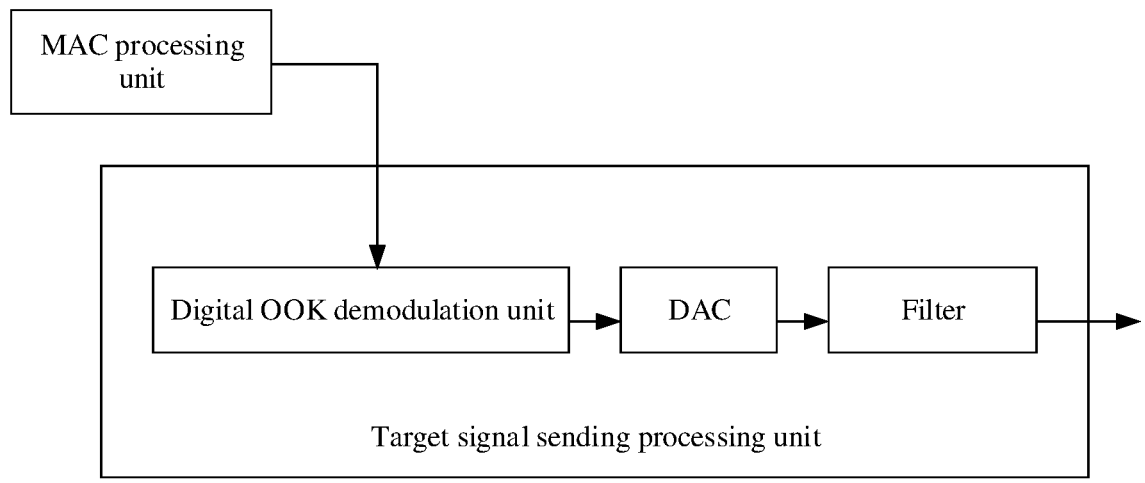
FIG. 9 is a schematic diagram of a structure of another target signal sending processing unit according to an embodiment.
Figure 10:
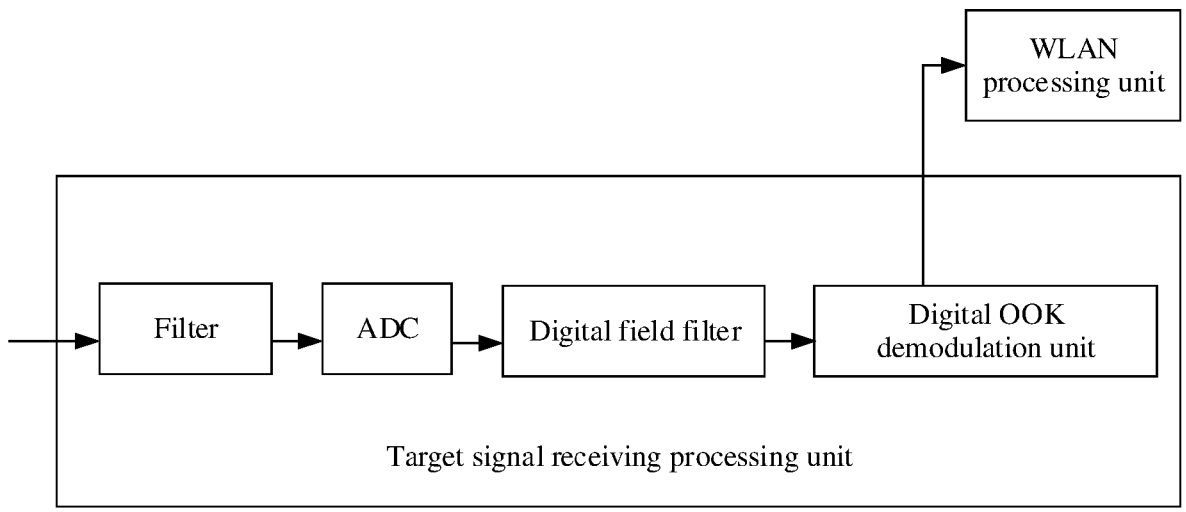
FIG. 10 is a schematic diagram of a structure of another target signal receiving processing unit according to an embodiment.

In another optional embodiment, the target signal is obtained through digital OOK modulation. The baseband processing device stores a digital sampling signal lookup table of a sampling rate. FIG. 9 is a schematic diagram of a structure of another target signal sending processing unit according to this embodiment. FIG. 10 is a schematic diagram of a structure of another target signal receiving processing unit according to this embodiment.

As shown in FIG. 9, the target signal sending processing unit includes a digital OOK modulation unit, a digital-to-analog converter (DAC), a filter, and the like. The digital OOK modulation unit and the MAC processing unit are connected. After determining that the PPDU sent by the STA needs to be replied to, the MAC processing unit transmits the immediate response indication to the digital OOK modulation unit. The digital OOK modulation unit searches, based on the immediate response indication, the digital sampling signal lookup table of the sampling rate for a single-frequency signal (that is, the target signal) of a specified sampling rate. Otherwise, the digital OOK modulation unit outputs zero. The sampling rate of the single-frequency signal is positively correlated with a frequency of the single-frequency signal. For example, the frequency of the single-frequency signal may be less than 20 megahertz (MHz). In this case, a value of the sampling rate of the single-frequency signal may be 40 Msps (million samples per second). The filter may be configured to filter out an image introduced by the DAC, and the image is an interference signal relative to the target signal. The filter may be a low-pass filter.

As shown in FIG. 10, the target signal receiving processing unit includes a filter, an analog-to-digital converter (ADC), a digital field filter, and a digital OOK demodulation unit. The filter is configured to filter out the target signal. The filter may be a low-pass filter or the filter may be a wavetrap. The digital field filter is configured to filter out the image introduced by the ADC. The digital OOK demodulation unit and the WLAN processing unit are connected. The digital analog OOK demodulation unit is configured to: perform digital field OOK demodulation on the filtered signal, and after determining that the target signal is obtained, transmit the immediate response indication to the WLAN processing unit.

In this embodiment, after the MAC processing unit of the baseband processing device determines that the STA needs to be replied to with the response frame, the MAC processing unit transmits the immediate response indication to the target signal sending processing unit and generates the part of the response frame except the target field based on the frame from the radio frequency processing device. For a process in which the MAC processing unit generates the part of the response frame except the target field, refer to related descriptions in the IEEE 802.11 series protocol. Details are not described in this embodiment again. Optionally, for a generation process and a transmission process of the part of the response frame of the PPDU except the target field, refer to the following step 406 to step 408.

Step 406: The baseband processing device generates the part of the response frame of the PPDU except the target field.

Optionally, when the target field includes an L-STF and an L-LTF, the baseband processing device generates an L-SIG and a data field. The baseband processing device generates the part of the response frame of the PPDU except the target field by using the MAC processing unit, then completes baseband processing by using the WLAN PHY processing unit, completes framing by using the remote interface group/deframing unit, and transmits the part of the response frame of the PPDU except the target field to the Ethernet PHY unit through the serial interface.

Step 407: The baseband processing device sends the part of the response frame of the PPDU except the target field to the radio frequency processing device by using the wired medium.

Step 408: The radio frequency processing device sends the part of the response frame of the PPDU except the target field to the air interface immediately after sending the target field.

In a process of sending the target field to the air interface, the radio frequency processing device receives, by using the wired medium, the part that is of the response frame of the PPDU except the target field and that is from the baseband processing device, and then sends the part content to the air interface immediately after sending the target field. Alternatively, after finishing sending the target field to the air interface, the radio frequency processing device receives, by using the wired medium, the part that is of the response frame of the PPDU except the target field and that is from the baseband processing device, and immediately sends the part content to the air interface.

It should be noted that a sequence of the steps in the method for replying with a response frame provided in this embodiment may be properly adjusted, or a step may be correspondingly increased or decreased based on a situation. Any variation method readily figured out by a person skilled in the art shall fall within the scope of the embodiments. Therefore, details are not described herein again.

In conclusion, according to the method for replying with a response frame provided in this embodiment, after determining that the PPDU sent by the STA needs to be responded to, the baseband processing device sends, to the radio frequency processing device by using the wired medium, the target signal indicating that the PPDU needs to be immediately responded to. The target signal does not need to be processed by the MAC processing unit, the WLAN PHY processing unit, and the like in the baseband processing device. After receiving the target signal, the radio frequency processing device immediately generates the target field that includes the first field of the response frame of the PPDU and sends the target field to the air interface. In this embodiment, the baseband processing device does not need to generate the target field of the response frame, but indicates, by modulating the target signal, the radio frequency processing device to generate the target field. Therefore, this reduces a processing delay constraint of the MAC processing unit or the like of the baseband processing device and reduces a delay of sending the response frame by the radio frequency processing device to the air interface, so that the AP system can reply with the response frame within one SIFS from the air interface end moment of the PPDU. In addition, the baseband processing device does not need to generate the target field of the response frame, thereby further saving a processing resource of the baseband processing device.

Figure 11:
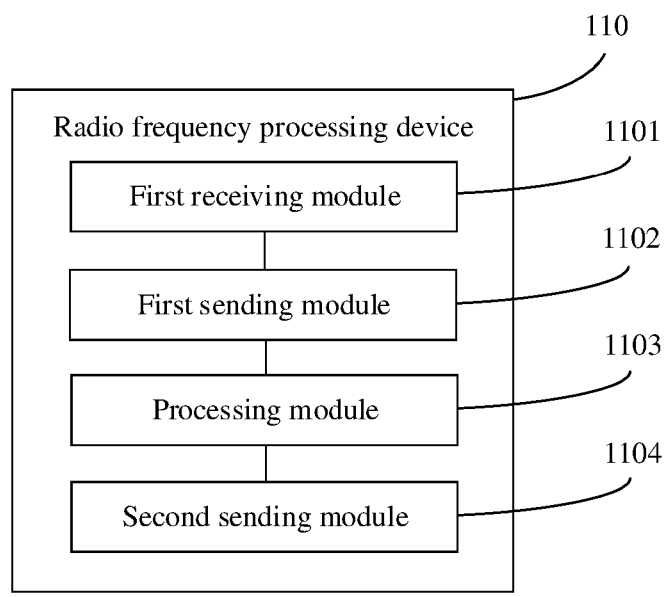
FIG. 11 is a schematic diagram of a structure of a radio frequency processing device according to an embodiment.

FIG. 11 is a schematic diagram of a structure of a radio frequency processing device according to an embodiment. The radio frequency processing device may be the radio frequency processing device 102 in the AP system shown in FIG. 1. As shown in FIG. 11, the radio frequency processing device 110 includes:

- a first receiving module 1101, configured to receive a PPDU sent by a station STA;
- a first sending module 1102, configured to send, to a baseband processing device by using a wired medium, a frame obtained based on the PPDU, where the radio frequency processing device and the baseband processing device are remotely separated;
- a processing module 1103, configured to: in response to a target signal that is received by using the wired medium and that is from the baseband processing device, generate a target field, where the target field at least includes a first domain of a response frame of the PPDU, and the target signal is used to indicate the radio frequency processing device to immediately respond to the PPDU; and
- a second sending module 1104, configured to send the target field to an air interface.

Figure 12:
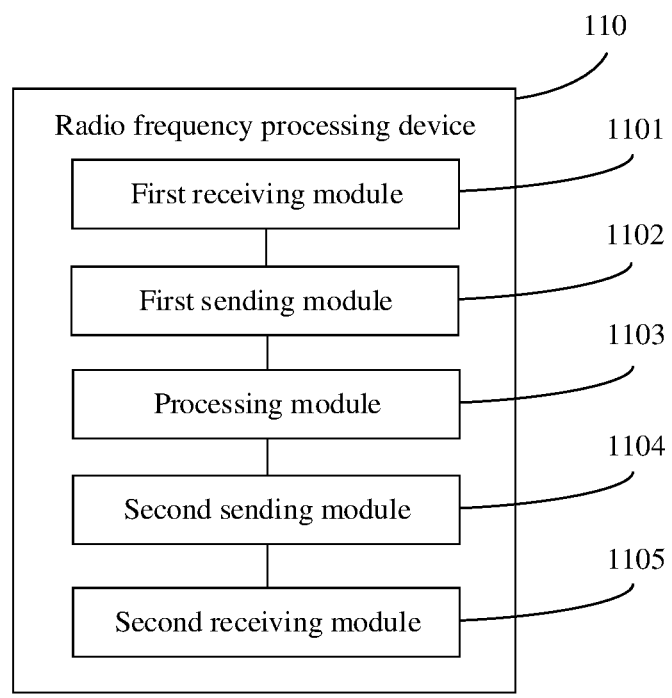
FIG. 12 is a schematic diagram of a structure of another radio frequency processing device according to an embodiment.

Optionally, as shown in FIG. 12, the radio frequency processing device 110 further includes a second receiving module 1105.

The second receiving module 1105 is configured to receive, by using the wired medium, a part that is of the response frame of the PPDU except the target field and that is from the baseband processing device. The second sending module 1104 is further configured to send the part of the response frame of the PPDU except the target field to the air interface immediately after sending the target field.

Optionally, the target signal is a single-frequency signal.

Optionally, both a signal used to transmit the frame obtained based on the PPDU and a signal used to transmit the part of the response frame of the PPDU except the target field that are between the radio frequency processing device and the baseband processing device are broadband signals. The target signal and the broadband signal are superimposed for transmission.

Optionally, the wired medium includes one or more pairs of signal lines, the broadband signal is a differential signal, the target signal is a common-mode signal, and the processing module 1103 is further configured to perform superimposition processing on a signal on a first signal line and a signal on a second signal line, to obtain the target signal.

Optionally, the target field successively includes a legacy short training field and a legacy long training field.

In conclusion, in this embodiment, after determining that the PPDU sent by the STA needs to be responded to, the baseband processing device sends, to the radio frequency processing device by using the wired medium, the target signal indicating that the PPDU needs to be immediately responded to. The target signal does not need to be processed by a MAC processing unit, a WLAN PHY processing unit, and the like in the baseband processing device. After receiving the target signal, the radio frequency processing device immediately generates the target field that includes the first field of the response frame of the PPDU and sends the target field to the air interface. In this embodiment, the baseband processing device does not need to generate the target field of the response frame, but indicates, by modulating the target signal, the radio frequency processing device to generate the target field. Therefore, this reduces a processing delay constraint of the MAC processing unit or the like of the baseband processing device and reduces a delay of sending the response frame by the radio frequency processing device to the air interface, so that the AP system can reply with the response frame within one SIFS from an air interface end moment of the PPDU. In addition, the baseband processing device does not need to generate the target field of the response frame, thereby further saving a processing resource of the baseband processing device.

Figure 13:
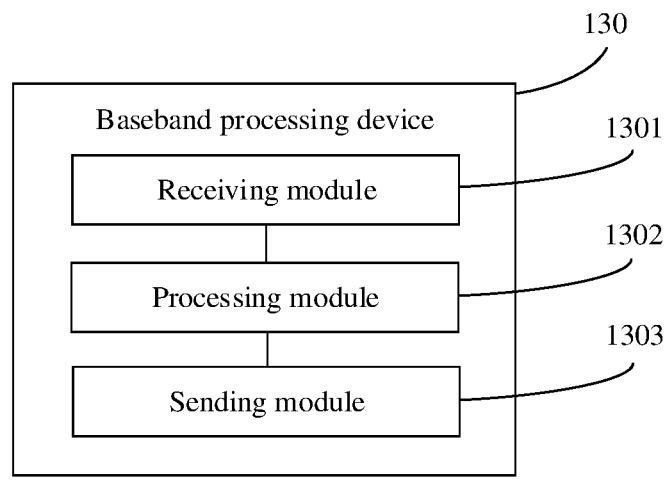
FIG. 13 is a schematic diagram of a structure of a baseband processing device according to an embodiment.

FIG. 13 is a schematic diagram of a structure of a baseband processing device according to an embodiment. The baseband processing device may be the baseband processing device 101 in the AP system shown in FIG. 1. As shown in FIG. 13, the baseband processing device 130 includes:

- a receiving module 1301, configured to receive a frame from a radio frequency processing device by using a wired medium, where the frame is obtained based on a PPDU sent by a station STA, and the radio frequency processing device and the baseband processing device are remotely separated;
- a processing module 1302, configured to: when the baseband processing device determines, based on the frame, that the STA needs to be replied to with a response frame, generate a target signal, where the target signal is used to indicate the radio frequency processing device to immediately respond to the PPDU; and
- a sending module 1303, configured to send the target signal to the radio frequency processing device by using the wired medium.

Optionally, the processing module 1302 is further configured to generate a part of the response frame of the PPDU except a target field. The target field at least includes a first field of the response frame of the PPDU. The sending module 1303 is further configured to send the part of the response frame of the PPDU except the target field to the radio frequency processing device by using the wired medium.

Optionally, the target signal is a single-frequency signal.

Optionally, both a signal used to transmit the frame obtained based on the PPDU and a signal used to transmit the part of the response frame of the PPDU except the target field that are between the radio frequency processing device and the baseband processing device are broadband signals, and the sending module 1303 is configured to: couple the target signal to the wired medium, so that the target signal and the broadband signal are superimposed for transmission.

Optionally, the wired medium includes one or more pairs of signal lines, and the sending module 1303 is configured to: couple the target signal to at least one pair of signal lines. The broadband signal is a differential signal, and the target signal on each pair of signal lines is a common-mode signal; or the broadband signal is a common-mode signal, and the target signal on each pair of signal lines is a differential signal.

Optionally, the target signal is obtained through OOK modulation.

In conclusion, in this embodiment, after determining that the PPDU sent by the STA needs to be responded to, the baseband processing device sends, to the radio frequency processing device by using the wired medium, the target signal indicating that the PPDU needs to be immediately responded to. The target signal does not need to be processed by a MAC processing unit, a WLAN PHY processing unit, and the like in the baseband processing device. After receiving the target signal, the radio frequency processing device immediately generates the target field that includes the first field of the response frame of the PPDU and sends the target field to an air interface. In this embodiment, the baseband processing device does not need to generate the target field of the response frame, but indicates, by modulating the target signal, the radio frequency processing device to generate the target field. Therefore, this reduces a processing delay constraint of the MAC processing unit or the like of the baseband processing device, and reduces a delay of sending the response frame by the radio frequency processing device to the air interface, so that the AP system can reply with the response frame within one SIFS from an air interface end moment of the PPDU. In addition, the baseband processing device does not need to generate the target field of the response frame, thereby further saving a processing resource of the baseband processing device.

For the apparatus in the foregoing embodiment, manners of executing operations by each module are described in detail in embodiments related to the method. Details are not described herein.

An embodiment may provide a radio frequency processing device, including a processor and a communications interface. The communications interface includes a wireless communications interface and a wired communications interface.

The processor is configured to invoke a computer program to implement an action performed by the radio frequency processing device in the foregoing method embodiment.

The processor is configured to exchange information with an STA through the wireless communications interface, and exchange information with a baseband processing device through the wired communications interface.

Figure 14:
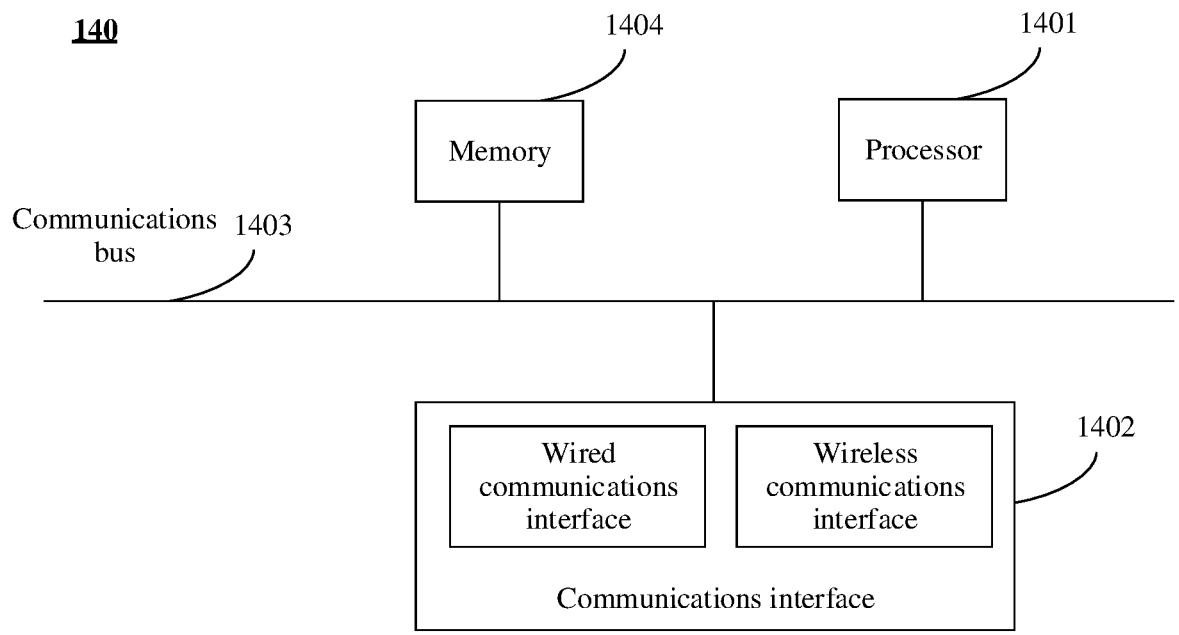
FIG. 14 is a block diagram of a radio frequency processing device according to an embodiment.

For example, FIG. 14 is a block diagram of the radio frequency processing device according to this embodiment. As shown in FIG. 14, the radio frequency processing device includes a processor 1401 and a communications interface 1402. Optionally, the radio frequency processing device further includes a communications bus 1403 and a memory 1404.

The processor 1401, the memory 1404, and the communications interface 1402 are connected to each other through the communications bus 1403. The communications bus 1403 may be a peripheral component interconnect (PCI) bus, an extended industry standard architecture (EISA) bus, or the like. The communications bus may be classified into an address bus, a data bus, a control bus, and the like. For ease of representation, only one thick line may be used to represent the bus in FIG. 14, but this does not mean that there is only one bus or only one type of bus.

The processor 1401 may include a central processing unit (CPU), a network processor (NP), or a combination of the CPU and the NP. And/or the processor 1401 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), generic array logic (GAL), or any combination thereof.

Optionally, the memory 1404 may be configured to a computer program, and the computer program includes program instructions. The processor 1401 is configured to invoke the computer program to implement an action performed by the radio frequency processing device in the foregoing method embodiment.

The memory 1404 may include a volatile memory, for example, a random access memory (RAM). The memory may alternatively include a nonvolatile memory, for example, a flash memory, a hard disk drive (HDD), or a solid-state drive (SSD). The memory 1404 may alternatively include a combination of the foregoing types of memories.

There may be a plurality of communications interfaces 1402. The communications interface 1402 is configured to communicate with another device, for example, communicate with the baseband processing device or the STA. The communications interface 1402 includes the wired communications interface, and the wired communications interface includes an Ethernet interface. The Ethernet interface may be an optical interface, an electrical interface, or a combination thereof. The communications interface 1402 further includes the wireless communications interface. The wireless communications interface may be a WLAN interface, an RF interface, a ZigBee network interface, a cellular network communications interface, a combination thereof, or the like.

An embodiment may provide a baseband processing device, including a processor and a communications interface.

The processor is configured to invoke a computer program to implement an action performed by the baseband processing device in the foregoing method embodiment.

The processor is configured to exchange information with a radio frequency processing device through the communications interface.

Figure 15:
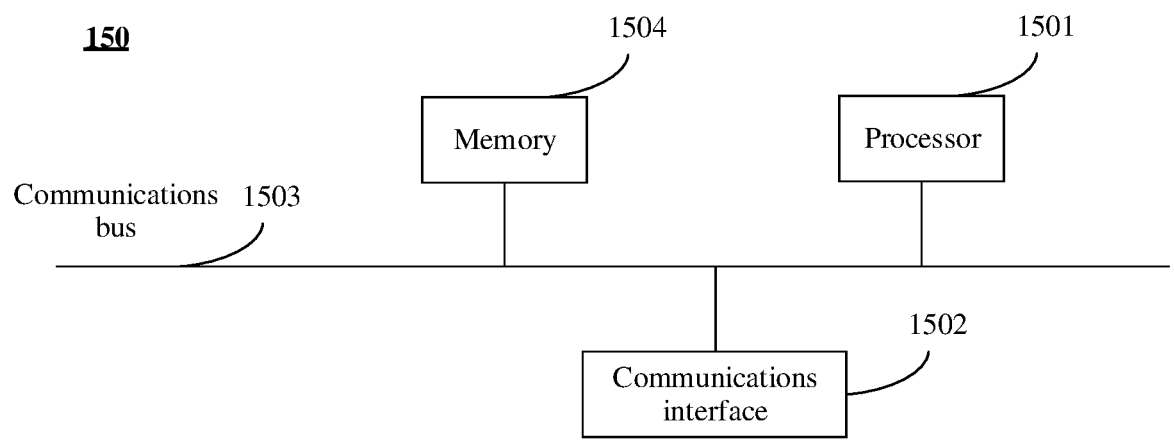
FIG. 15 is a block diagram of a baseband processing device according to an embodiment.

For example, FIG. 15 is a block diagram of the baseband processing device according to this embodiment. As shown in FIG. 15, the baseband processing device includes a processor 1501 and a communications interface 1502. Optionally, the baseband processing device further includes a communications bus 1503 and a memory 1504.

The processor 1501, the memory 1504, and the communications interface 1502 are connected to each other through the communications bus 1503. The communications bus 1503 may be a PCI bus, an EISA bus, or the like. The communications bus may be classified into an address bus, a data bus, a control bus, and the like. For ease of representation, only one thick line may be used to represent the bus in FIG. 15, but this does not mean that there is only one bus or only one type of bus.

The processor 1501 may include a CPU, an NP, or a combination of the CPU and the NP. And/or the processor 1501 may further include a hardware chip. The hardware chip may be an ASIC, a PLD, or a combination thereof. The PLD may be a CPLD, an FPGA, GAL, or any combination thereof.

Optionally, the memory 1504 may be configured to a computer program, and the computer program includes program instructions. The processor 1501 is configured to invoke the computer program to implement an action performed by the baseband processing device in the foregoing method embodiment.

The memory 1504 may include a volatile memory, for example, a RAM. The memory may alternatively include a nonvolatile memory, for example, a flash memory, an HDD, or an SSD. The memory 1504 may alternatively include a combination of the foregoing types of memories.

There may be a plurality of communications interfaces 1502, and the communications interface 1502 is configured to communicate with another device, for example, communicate with a radio frequency processing device. The communications interface 1502 includes a wired communications interface, and the wired communications interface 15021 includes an Ethernet interface. The Ethernet interface may be an optical interface, an electrical interface, or a combination thereof.

An embodiment may further provide an access point (AP) system, including a baseband processing device and a radio frequency processing device. The baseband processing device and the radio frequency processing device are connected by using a wired medium, and the baseband processing device and the radio frequency processing device are remotely separated.

The baseband processing device is the baseband processing device shown in FIG. 13 or FIG. 15, and the radio frequency processing device is the radio frequency processing device shown in FIG. 11, FIG. 12, or FIG. 14.

An embodiment may further provide a non-transitory computer storage medium. The non-transitory computer storage medium stores instructions. When the instructions are executed by a processor of a computer device, an action performed by the radio frequency processing device or the baseband processing device in the foregoing method embodiments is implemented.

A person of ordinary skill in the art may understand that all or some of the steps of embodiments may be implemented by hardware or a program instructing related hardware. The program may be stored in a non-transitory computer-readable storage medium. The non-transitory storage medium may be a read-only memory, a magnetic disk, an optical disc, or the like.

In the embodiments, the terms "first", "second", and "third" are merely used for description, but should not be understood as an indication or implication of relative importance.

The term "and/or" merely describes an association relationship between associated objects and indicates that three relationships may exist. For example, A and/or B may indicate the following cases: only A exists, both A and B exist, and only B exists. In addition, the character "/" generally represents an "or" relationship between the associated objects.

The foregoing descriptions are only optional embodiments but are not intended to limit. Any modification, equivalent replacement, or improvement should fall within the scope of the embodiments.

What is claimed is:

1. A method for replying with a response frame, the method comprising:
receiving, by a radio frequency processing device, a physical layer protocol data unit (PPDU) sent by a station (STA);
sending, by the radio frequency processing device to a baseband processing device by using a wired medium, a frame obtained based on the PPDU, wherein the radio frequency processing device and the baseband processing device are remotely separated;
in response to a target signal that is received by using the wired medium and that is from the baseband processing device, generating, by the radio frequency processing device, a target field, and sending the target field to an air interface, wherein the target field at least comprises a first field of a response frame of the PPDU, and the target signal is used to indicate the radio frequency processing device to immediately respond to the PPDU;
receiving, by the radio frequency processing device by using the wired medium, a part that is of the response frame of the PPDU except the target field and that is from the baseband processing device; and
sending, by the radio frequency processing device, the part of the response frame of the PPDU except the target field to the air interface immediately after sending the target field.

2. The method according to claim 1, wherein the target signal is a single-frequency signal.

3. The method according to claim 1, wherein both a signal used to transmit the frame obtained based on the PPDU and a signal used to transmit the part of the response frame of the PPDU except the target field that are between the radio frequency processing device and the baseband processing device are broadband signals, wherein the target signal and the broadband signal are superimposed for transmission.

4. The method according to claim 3, wherein the wired medium comprises one or more pairs of signal lines, the broadband signal is a differential signal, the target signal is a common-mode signal, and the method further comprises:
performing, by the radio frequency processing device, superimposition processing on a signal on a first signal line and a signal on a second signal line, to obtain the target signal, wherein the first signal line and the second signal line are a pair of signal lines used to transmit the target signal.

5. The method according to claim 1, wherein the target field successively comprises a legacy short training field and a legacy long training field.

6. The method according to claim 1, wherein the target signal is obtained through on-off keying (OOK) modulation.

7. The method according to claim 1, wherein the radio frequency processing device comprises a first receiving module configured to receive the PPDU sent by the STA.

8. The method according to claim 7, wherein the radio processing device further comprises a first sending module configured to send to the baseband processing device by using a wired medium and the baseband processing device are remotely separated.

9. A method for replying with a response frame, the method comprising:
receiving, by a baseband processing device, a frame from a radio frequency processing device by using a wired medium, wherein the frame is obtained based on a physical layer protocol data unit (PPDU) sent by a station (STA), and the radio frequency processing device and the baseband processing device are remotely separated;
when the baseband processing device determines, based on the frame, that the STA needs to be replied to with a response frame, generating, by the baseband processing device, a target signal, wherein the target signal is used to indicate the radio frequency processing device to immediately respond to the PPDU;
sending, by the baseband processing device, the target signal to the radio frequency processing device by using the wired medium;
generating, by the baseband processing device, a part of the response frame of the PPDU except a target field, wherein the target field at least comprises a first field of the response frame of the PPDU; and
sending, by the baseband processing device, the part of the response frame of the PPDU except the target field to the radio frequency processing device by using the wired medium.

10. The method according to claim 9, wherein the target signal is a single-frequency signal.

11. The method according to claim 9, wherein both a signal used to transmit the frame obtained based on the PPDU and a signal used to transmit the part of the response frame of the PPDU except the target field that are between the radio frequency processing device and the baseband processing device are broadband signals, and the sending, by the baseband processing device, the target signal to the radio frequency processing device by using the wired medium comprises:

coupling, by the baseband processing device, the target signal to the wired medium, so that the target signal and the broadband signal are superimposed for transmission.

12. The method according to claim 11, wherein the wired medium comprises one or more pairs of signal lines, and the coupling, by the baseband processing device, the target signal to the wired medium comprises:
coupling, by the baseband processing device, the target signal to at least one pair of signal lines, wherein
the broadband signal is a differential signal, and the target signal on each pair of signal lines is a common-mode signal; or the broadband signal is a common-mode signal, and the target signal on each pair of signal lines is a differential signal.

13. The method according to claim 9, wherein the target signal is obtained through on-off keying (OOK) modulation.

14. The method according to claim 9, wherein the target field successively comprises a legacy short training field and a legacy long training field.

15. The method according to claim 9, wherein the radio frequency processing device comprises a first receiving module configured to receive the PPDU sent by the STA.

16. The method according to claim 15, wherein the radio processing device further comprises a first sending module configured to send to the baseband processing device by using a wired medium and the baseband processing device are remotely separated.

17. A radio frequency processing device, comprising a processor, a non-transitory memory, and a communications interface, wherein the communications interface comprises a wireless communications interface and a wired communications interface; and
the processor is configured to invoke a computer program stored in the non-transitory memory to implement the method according to claim 9.

18. A radio frequency processing device, comprising a processor, a non-transitory memory, and a communications interface, wherein the communications interface comprises a wireless communications interface and a wired communications interface;
the processor is configured to invoke a computer program stored in the non-transitory memory to implement the method according to claim 1; and
the processor is configured to exchange information with a station (STA) through the wireless communications interface, and exchange information with a baseband processing device through the wired communications interface.

* * * * *